Patented Jan. 5, 1932

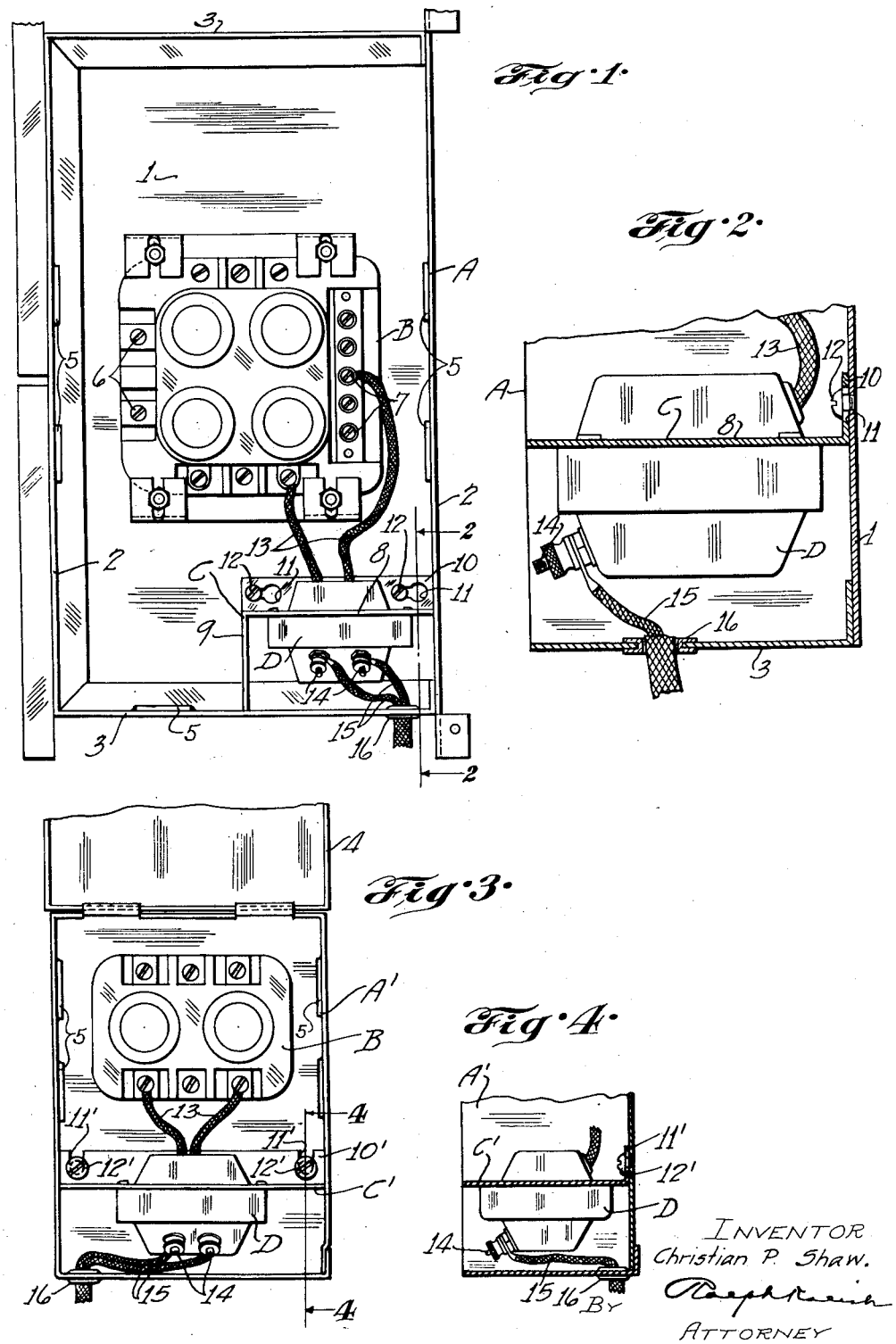

1,839,348

UNITED STATES PATENT OFFICE

CHRISTIAN P. SHAW, OF ST. LOUIS, MISSOURI, ASSIGNOR TO KILLARK ELECTRIC MANUFACTURING COMPANY, OF ST. LOUIS, MISSOURI, A CORPORATION OF MISSOURI

CUT OUT BOX

Application filed May 31, 1929. Serial No. 367,567.

This invention relates generally to cut-out boxes for electric wiring installations. More particularly, my invention relates to a certain new and useful improvement in cut-out boxes especially adapted for branch circuits.

It is a general underwriters' requirement that, in branch circuit installations, as a protection against fire hazards, the low tension circuit be suitably partitioned off from the high tension circuit; and my present invention has for its chief object the provision of means whereby the branch circuit cut-out box may in a simple, economical, and convenient manner be efficiently equipped to meet and fulfill the requirement stated.

And with the above and other objects in view, my invention resides in the novel features of form, construction, arrangement, and combination of parts hereinafter described and pointed out in the claims.

In the accompanying drawings,—

Figure 1 is a plan view of a branch circuit cut-out box embodying my invention, the cover of the box being removed;

Figure 2 is an enlarged detail sectional view thereof taken approximately on the line 2—2, Figure 1;

Figure 3 is a reduced plan view of a slightly modified branch circuit cut-out box embodying my invention, the cover of the box being in open position; and Figure 4 is a detail sectional view taken approximately on the line 4—4, Figure 3.

Referring now more in detail and by reference characters to the drawings, which illustrate practical embodiments of my invention, A designates the box proper, which is substantially of standard construction and, as is common, comprises a back or rear wall 1, opposed side walls 2, 2, and opposed end walls 3, 3, all preferably constructed of suitable sheet metal, and all rigidly joined together in box formation. The box A may also include a suitable hinged or other cover or lid 4, as in Figure 3, and in all or some of its side and end walls 2 and 3 is formed with so-called knock-outs, as at 5, for facilitating convenient passage of the circuit and service wires. Suitably fixed within the box A, is a fuse-block or panel B having terminals, as at 6, 7, for the circuit leads and service conductors.

C designates a section of sheet metal or other suitable material of preferably angular configuration to include right-angularly disposed portions 8, 9, and of relative dimensions to nicely fit in a corner of the box A, as shown in Figures 1 and 2. Provided at the base of the one portion or wall 8 of section C, is a flange, as at 10, formed with key-hole or other suitable slots 11 for convenient engagement with screws or the like 12 co-operatively disposed on the rear wall 1 of box A, whereby the section C may be readily secured detachably to and within the box A.

Permanently mounted on the partition C, is a transformer D of any suitable or desirable construction or type, of which the primary leads 13 are disposed upon the one or high tension side, and the secondary leads or terminals 14 are disposed upon the other or low tension side, of the partition-wall 8.

As so constructed, the partition C and transformer D are adapted as a unit for disposition within the box A, the partition C being then engaged at its slots 11 with the screws 12 and the unit thereby secured detachably in operative location within the box A. The partition C, in combination with the adjacent portions of the one side and end wall 2 and 3 of the box A, thus provide a compartment within the box A for the so-called low tension side of the transformer and its connections, the secondary leads or terminals 14 being conveniently engaged electrically with service wires 15 led into the box through an adjacent knock-out opening, as at 16, and the partition thereby also providing a barrier separating the low tension circuit from the housed parts of the high tension circuit, the primary leads 13 being wholly housed within the box A and conveniently connected electrically, as shown, with the also housed panel B.

The branch circuit cut-out box of Figures 3 and 4 is substantially similar to the box of Figures 1 and 2, except that the partition C' is of dimensions to extend within the box A' from side wall to side wall thereof, as shown, the base-flange 10' being provided with spaced open-end slots, as at 11', for convenient detachable partition-supporting engagement with screws 12' similarly disposed upon the box rear wall 1.

The so equipped box of Figures 1 and 2 is somewhat more commodious than the box of Figures 3 and 4, in that the former conveniently provides for use not only of the knock-outs 5 of the side walls 2 but also of the knock-out 5 of the compartment-forming end-wall 3, while in the latter the knockouts 5 of the side walls only are usable. However, in either construction, the standard box A or A', when equipped as I have described, efficiently affords positive separation between the low tension circuit and the housed portions of the high tension circuit and meets in such regard all underwriters' requirements.

It is to be understood that other changes and modifications in the form, construction, arrangement, and combination of the several parts of my new box may be made and substituted for those herein shown and described without departing from the nature and principle of my invention.

Having thus described my invention, what I claim and desire to secure by Letters Patent is:

1. In a branch circuit cut-out box, the combination with the box proper including its side and end walls for housing certain parts of the high tension circuit, of a partition-wall, a transformer permanently mounted on the partition-wall with its primary and secondary leads disposed upon opposite sides thereof, the partition wall and transformer being adapted as a unit for disposition to reside within the box, and means engaging the box and partition walls for detachably retaining the partition and transformer as a unit operatively within the box, the partition forming with portions of the box side and end walls a compartment within the box for the secondary leads of the transformer and also providing a barrier for separating the housed parts of the high tension circuit from the low tension circuit.

2. In a branch circuit cut-out box, the combination with the box proper including its side and end walls for housing certain parts of the high tension circuit, of an angular partition wall adapted to fit within a corner of the box, a transformer permanently mounted on the partition-wall with its primary and secondary leads disposed upon opposite sides thereof, and co-operative members on the box and partition walls for detachably retaining the partition and transformer as a unit operatively within the box, the partition forming with a corner portion of the box a compartment within the box for the secondary leads of the transformer and also providing a barrier for separating the housed parts of the high tension circuit from the low tension circuit.

In testimony whereof, I have signed my name to this specification.

CHRISTIAN P. SHAW.